United States Patent [19]

Van Remoortel

[11] 4,135,773
[45] Jan. 23, 1979

[54] SNAP-FITTING

[75] Inventor: John G. Van Remoortel, Wilmington, Del.

[73] Assignee: E. I. Du Pont de Nemours and Company, Wilmington, Del.

[21] Appl. No.: 820,045

[22] Filed: Jul. 28, 1977

[51] Int. Cl.² .............................................. F16C 33/00
[52] U.S. Cl. ................ 308/238; 308/DIG. 8; 403/365
[58] Field of Search ...................... 308/238, 26, 237 R, 308/15, 237 A, DIG. 8, DIG. 7, 240; 403/365, 372; 260/2.5 A, 2.5 AQ; 174/153 G, 153 R; 293/88, 71 A; 252/12

[56] References Cited

U.S. PATENT DOCUMENTS 3,203,304  8/1965  Rapata .................................. 308/238
3,774,983  11/1973  Lagally .......................... 308/DIG. 8

Primary Examiner—Galen L. Barefoot
Assistant Examiner—Douglas C. Butler

[57] ABSTRACT

A fitting which can be snap-fit into a housing and used as a journal bearing, bushing fastener, or other machine element, comprising a unitary annular body of a resilient polymeric material, with molecular weight greater than 1,000,000. The body has two intersecting peripheral surfaces. A protuberance is located at such intersection to removably retain the body in the housing. The disclosures include steps for making the article. The article features greatly improved wear and life-cycle characteristics over similarly used prior art.

6 Claims, 11 Drawing Figures

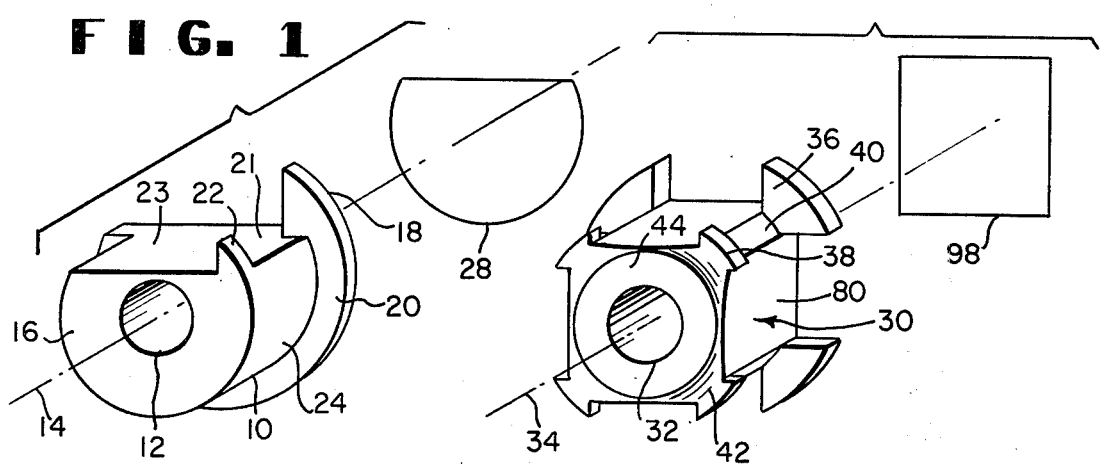
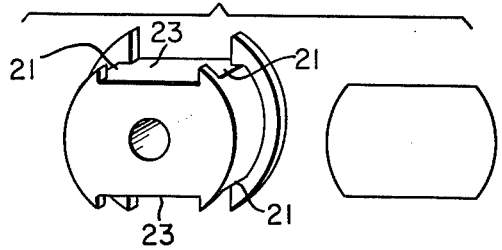
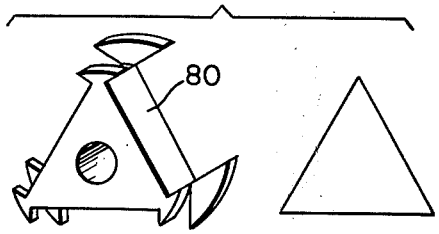
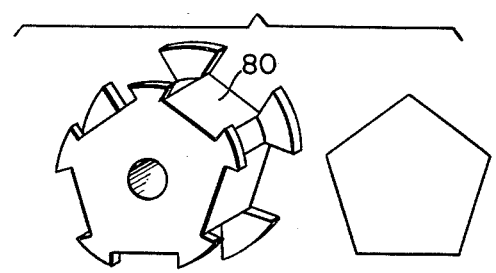
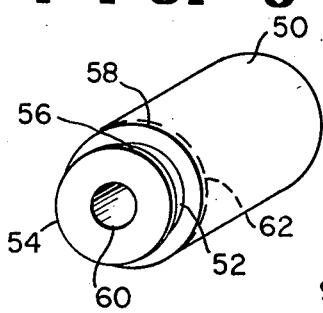
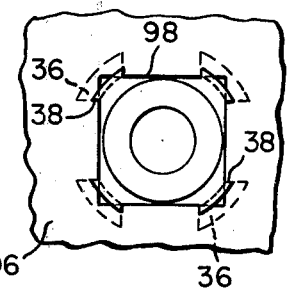
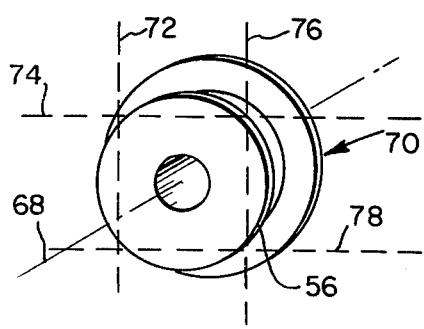
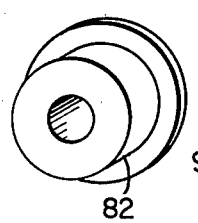
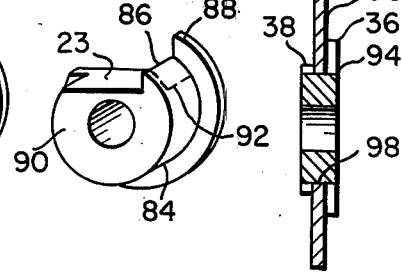

SNAP-FITTING

BACKGROUND OF THE INVENTION

This invention relates to snap-fittings and particularly to snap-fit polymeric journal bearings used, for example, in photographic film processors. The invention concerns the design structure, manufacture, and use of such articles.

A major problem with respect to the use of polymeric journal bearings in photographic film processors has been the relatively high wear rates associated with their use. This is particularly true of low molecular weight injection-molded polymeric bearings. Such bearings have relatively short lives when subjected to corrosive fluids and/or abrasive environments containing dirt and other foreign particulate matter.

High and ultrahigh molecular weight (molecular weight greater than 1,000,000) polymeric bearings exhibit a greatly improved wear rate over those of lower molecular weight. However, the cost of bearings prepared from higher molecular weight polymeric materials has not been competitive with that of low molecular weight polymeric bearings. Unlike low molecular weight polymeric materials, high and ultrahigh molecular weight polymeric materials are not feasibly injection-molded. The greater the molecular weight, the more difficult injection molding becomes. Hence, the higher molecular weight materials must be machined at resultingly greater costs. Thus, there has been a need for high and ultrahigh molecular weight polymeric bearings, which can be provided at a cost comparing more favorably with injection-molded low density polymeric bearings.

SUMMARY OF THE INVENTION

The snap fitting of this invention is fabricated of a resilient polymeric material, preferably an ultrahigh molecular weight polyethylene. In one embodiment, it has an annular-shaped body with a flange section at one end of a curvilinear peripheral surface and a protuberance opposite the flange section at the other end of the surface. The article has an axis which describes the centerline of a bore extending through its body, and has two end faces, both generally perpendicular to the axis.

In a preferred embodiment, the article is used as a snap-fit journal bearing, and differs from the first described embodiment in that it has four planar flange sections orthogonally positioned about its peripheral surface and four planar protuberances, each located in direct axial alignment with and opposite one of the four flange sections. A recess separates each flange section from its corresponding protuberance. In each embodiment, the protuberances deform resiliently to allow the article to be inserted into a housing having a thickness approximately equal to the axial length of the recesses so that the flange sections and protuberances cooperate to retain the article in the housing.

A method of making the articles of this invention involves several machining steps. For example in making a preferred embodiment, a circumferential groove is machined into a cylindrical rod of suitable resilient polymeric material to form a first peripheral flange between the groove and end of the rod. A bore is machined into the end of the rod, the centerline of the bore coinciding with the axis of the rod. In a plane perpendicular to the axis of the rod, a section of the rod containing the groove is severed, thus creating a second flange positioned between the point of severance and the groove. The result is an annular shaped structure having a flange at each end. Four flat surfaces are then created in the structure's peripheral surface by removing portions of the flanges and groove in four orthogonal planes parallel to the axis of the section. Such removal is preferably accomplished by a skiving operation.

BRIEF DESCRIPTION OF THE DRAWINGS

The invention will be better understood by referring to the drawings in which:

FIG. 1 is a pictorial view of a simple embodiment of a snap fitting constructed in accordance with this invention;

FIG. 2 is a pictorial view of a preferred embodiment of this invention;

FIGS. 3–5 are pictorial views of still other embodiments of this invention;

FIG. 6 is a pictorial view of a rod from which a fitting of this invention is cut in accordance with the method of this invention;

FIG. 7 is a pictorial view of an unfinished fitting of this invention during its fabrication, such final fitting to have three or more flat surfaces in its periphery, as per FIGS. 2, 4, and 5;

FIG. 8 is a pictorial view of an unfinished fitting of this invention during its fabrication, such final fitting to have one or two flat surfaces in its periphery, as per FIGS. 1 and 3;

FIG. 9 is a pictorial view of an unfinished fitting of this invention during its fabrication, such final fitting to be as per FIG. 1, the dotted lines depicting material to be removed;

FIG. 10 is a sectional side view of an embodiment of this invention as positioned in a housing;

FIG. 11 is a frontal view of the embodiment of FIG. 2 positioned in a housing.

FIGS. 1–5 include corresponding shapes of housing openings in which the particular fittings can be snapfit. Although the embodiments depicted in the drawings are all symmetrical in shape, this invention covers asymmetrical shapes to the extent that the latter fall within the concept claimed. Moreover, the invention also covers embodiments having more than five peripheral flat surfaces.

DETAILED DESCRIPTION OF THE INVENTION

In one embodiment, the subject snap-fitting or article is designated 10 in FIG. 1. The article 10 is made of a resilient polymeric material, having an ultrahigh molecular weight, i.e., greater than 1,000,000. Preferably, the material is polyethylene. The use of a high molecular weight polymeric material provides for low wear rates in addition to strong resistance to dirt and corrosion. High molecular weight polymeric material also has high flexural strength and impact resistance. Collectively these factors provide long life for the article during use in field applications, for example, as a bearing in photographic film processing solutions.

In FIG. 1, a bore 12 extends through the annular shaped body of the article, the center 14 of the bore coinciding generally with the axis of rotation of a machine element not shown, e.g., a journal, to be inserted therein. The article has a first end face 18 and a second end face 16. A flange section 20 extends about a portion of the periphery of the article 10, the flange section 20 outlining a portion of the perimeter of the first face 18. Describing a portion of the perimeter of the second face 16 is a protuberance 22. An interspace between the flanged section 20 and the protuberance 22 is formed by a recess 21. The article has an interrupted peripheral surface, one portion 24 of which is cylindrical, a second portion 23 of which is flat and abuts the protuberance 22 and the flange section 20. Recess 21 is a coplanar extension of flat portion 23.

In use, the unitary snap-fit resilient polymeric article fits non-rotatably in a housing (depicted by the outline 28) which conforms in shape to the surfaces 23-24 and supports a rotating machine element such as a journal. The housing is held between the flange 20 and the protuberance 22. The protuberance, being resilient, facilitates the snap fit by deforming as the article is introduced into the housing.

The embodiment illustrated in FIG. 3 is substantially the same as the one illustrated in FIG. 1, differing only in that it has two flat portions 23 and two recesses 21 instead of one as in the case of FIG. 1.

In a preferred form, the subject article is as depicted in FIG. 2. The body 30 is, again, made of a resilient polymeric material as described. A bore 32 extends through the body, and, as in the first described article, the center 34 of the bore coincides generally with the axis of rotation of a machine element not shown, e.g., a journal, to be inserted therein. The article has an annular peripheral surface 40 interrupted by a plurality of flat portions 80 which are preferably flat surfaces for engaging the opening of a similarly shaped housing 98. The portions 80 are counterparts to the portion 23 of the first described article 10 in FIG. 1; they abut flange sections 36 and protuberances 38. Note that the preferred embodiment of FIG. 2 shows four orthogonal portions 80. It also shows four flange sections 36 and four protuberances 38.

Such an article, used as a journal bearing and fabricated of ultrahigh molecular weight polyethylene, has lasted sixteen to twenty-five times the life of a similar article fabricated of a lower molecular weight injection-molded thermoplastic polyester resin sold by Eastman Chemical Products, Inc., under the trade name Tenite®. In addition there was less of the abrasion and swelling otherwise suffered in an identical corrosive fluid environment.

Although not necessary for the operation of the article, a beveled end comprising a tapered portion can be useful in providing for easier insertion of the article into its housing. Thus in the preferred form of FIG. 2, a tapered portion 42 extends from the second face 44 of the article to the outermost periphery of the four protuberances 38.

The embodiments of FIGS. 4 and 5 are substantially the same as depicted in FIG. 2, differing only in that they have three and five flat surfaces 80, respectively, instead of four, as in FIG. 2.

The method of making this article utilizes several machining steps and is primarily useful with the non-injection moldable material. A different method of making applies to the embodiments of FIGS. 1 and 3, those having one and two peripheral surface portions 23, preferably flat, respectively. Their method of making will be described last.

For embodiments having the three or more peripheral surface portions 80, preferably flat, e.g., those of FIGS. 2, 4, and 5, the method of making comprises the following steps. Referring to FIG. 6, one end 54 of a rod 50 of resilient polymeric material of the type described above is first reduced in diameter. Then, a groove 52 is machined about the periphery. The formation of the groove 52 leaves two peripheral flanges 56 and 58. A bore 60 is machined through the end 54 of the rod to or beyond the dotted line 62 on the periphery of the rod 50. The section containing the groove and flanges is cut from the rod 50, at or about the dotted line 62, resulting in the two-flanged disc 70 as shown in FIG. 7.

Material is removed from the two-flanged disc 70 in three or more surfaces which include lines extending generally parallel to the axis 68 of the disc, thus creating three or more peripheral surface portions 80 on the disc 70.

For example, the preferred embodiment of FIG. 2 results from removing material, preferably by skiving, along the axis 68 (FIG. 7) of the two-flanged disc 70 in four orthogonal planes 72, 74, 76, and 78. The effect is to remove portions of material from both the flanges and groove to form four orthogonal peripheral flat surfaces 80 (FIG. 2). The intersections of the aforesaid planes (FIG. 7) form lines (not shown) which lie parallel to the axis 68. The radius of each protuberance 38 (FIG. 2) is preferably slightly less than the distance between such lines and the axis 68. Thus, as shown in FIG. 7, the circumference of flange 56 should preferably lie inside of the intersections of planes 72-74, 76-74, 78-76, and 72-78 for making the preferred embodiment. This permits the finished article to enter the housing opening 98 (FIG. 11) with a minimal amount of force, yet allowing for sufficient retention by the protuberances 38 (FIG. 11).

In FIG. 2, the optional tapered portion 42 should of course be machined prior to cutting the two-flanged disc 70 (FIG. 7) from the rod 50 (FIG. 6).

The embodiments of FIG. 1 and FIG. 3 require a modified method of making. Thus, for the two embodiments having one and two peripheral surface portions 23, respectively, the article severed from rod 50 (FIG. 6) is without the flange 56, and is thus depicted as the one-flanged disc 82 of FIG. 8. The disc 82 is also without the groove 52. Material is then removed from the disc 82 to form surface(s) 23 (FIG. 1 or FIG. 3). By way of illustration, if the embodiment of FIG. 1 is the end objective, removal of material along the central axis of disc 82 produces the configuration 84 of FIG. 9 wherein the projection 86 extends axially from the flange section 88 to the face 90. The material outlined by the dotted line 92 is then removed in order to form the embodiment of FIG. 1, wherein the recess 21 and protuberance 22 have been created. A similar illustration would apply to the embodiment of FIG. 3.

Finally, FIG. 10 depicts a sectional side view of an embodiment 94 of this invention as positioned in an opening 98 of a housing 96; FIG. 11 depicts the manner in which the protuberances 38 and flange sections 36 cooperate to retain the article in the housing opening 98. It may be noted that when the article is pressed into the opening 98, the protuberances deform resiliently to accommodate the opening. As the article passes into the opening, the protuberances snap back and extend beyond the opening thus engaging either side of the housing between the flanges 36 and the protuberances 38.

I claim:

1. A snap fitting comprising: a unitary article of a resilient polymeric material having an axis and a peripheral surface, said article having first and second faces generally perpendicular to said axis, said peripheral surface being annular except where interrupted by at least one flat portion thereon extending axially from said first face to said second face, said peripheral surface having at least one flange section perpendicular to said axis, said flange section also being interrupted by said flat portion and defining an edge of said first face of said article, said peripheral surface having at least one protuberance defining an edge of said second face.

2. The snap fitting of claim 1 wherein said material is ultrahigh molecular weight polyethylene, having a molecular weight greater than 1,000,000.

3. The snap fitting of claim 2 wherein said peripheral surface contains a plurality of said flat portions equiangularly positioned about said axis.

4. The snap fitting of claim 2 wherein said peripheral surface contains four flat portions orthogonally located about said axis, four flange sections orthogonally located about said axis and four protuberances orthogonally located about said axis.

5. The snap fitting of claim 4 wherein said unitary article contains a beveled end comprising a tapered portion extending from said second face to the outermost periphery of said protuberances.

6. As an article of manufacture, a snap fitting machined from an annular rod of a polymeric material, said article having opposed end faces, an otherwise annular peripheral surface interrupted by at least one flat portion, an interrupted flange projecting from said surface at one end and at least one flexible protuberance of lesser radial extent than the flange projecting from said surface at the other end, said flange being interrupted by said flat portion.

* * * * *